United States Patent [19]

den Hollander

[11] 4,423,358

[45] Dec. 27, 1983

[54] HORIZONTAL DEFLECTION CIRCUIT WITH LINEARITY CORRECTION

[75] Inventor: Willem den Hollander, Schlieren, Switzerland

[73] Assignee: RCA Corporation, New York, N.Y.

[21] Appl. No.: 383,055

[22] Filed: May 28, 1982

[30] Foreign Application Priority Data

Apr. 23, 1982 [GB] United Kingdom ............... 8211832

[51] Int. Cl.$^3$ ............................................. H01J 29/56
[52] U.S. Cl. .................................................. 315/371
[58] Field of Search ............... 315/408, 370, 371, 398, 315/399

[56] References Cited

U.S. PATENT DOCUMENTS

| | | | |
|---|---|---|---|
| Re. 25,772 | 5/1965 | Glaisher | 315/27 |
| 2,780,749 | 2/1957 | Dietch | 315/27 |
| 2,835,846 | 5/1958 | Teetor | 315/27 |
| 2,871,405 | 1/1959 | Vonderschmitt | 315/27 |
| 3,200,288 | 8/1965 | Tanner | 315/27 |
| 3,310,705 | 3/1967 | Nicholson | 315/27 |
| 3,510,723 | 5/1970 | Dumas | 315/27 |
| 3,814,981 | 6/1974 | Rusk | 315/27 |
| 3,962,603 | 6/1976 | Van der Vegt | 315/370 |
| 4,037,137 | 7/1977 | Dietz | 315/398 |
| 4,281,275 | 7/1981 | Chapman et al. | 315/399 |

OTHER PUBLICATIONS

RCA Television Service Data, Chassis CTC 87 Series, File 1978 C-2, copyright 1978; pp. 1, 5-27 and electrical schematic pp. 28-33.
RCA Television Service Data, Chassis CTC 101 Series, File 1980 C-7, copyright 1980; pp. 1, 8-17 and electrical schematic pp. 38-43.

Primary Examiner—Theodore M. Blum
Attorney, Agent, or Firm—E. M. Whitacre; P. J. Rasmussen; Joseph Laks

[57] ABSTRACT

In a television display system, a deflection yoke is placed over the neck of a cathode ray tube to generate a raster by means of simultaneous horizontal and vertical sweep of the electron beams. A picture, derived from information contained in the composite video signal produced by the signal processing circuits, is displayed on the screen of the cathode ray tube. In the horizontal deflection circuit portion of the television display system, a trace capacitor is coupled to a deflection winding. A trace switch, responsive to a deflection rate signal that is synchronized with the composite video signal, periodically applies to the deflection winding the voltage developed across the trace capacitor to generate raster scanning current in the deflection winding during a deflection cycle. The losses incurred during a deflection cycle tend to produce a scanning current waveform that introduces asymmetrical linearity distortion to the picture display. A switched current source is coupled to the deflection winding to develop a DC component that flows in a direction that provides correction for the introduction of the asymmetrical linearity distortion. The DC component is of sufficient magnitude to by itself produce substantially all of the change to the scanning current needed to obtain a picture display that is substantially corrected for the asymmetrical linearity distortion.

7 Claims, 5 Drawing Figures

HORIZONTAL DEFLECTION CIRCUIT WITH LINEARITY CORRECTION

This invention relates to linearity correction circuits for television receivers having a raster scanning type of display.

To measure horizontal nonlinearity in a television receiver, a test pattern having equally distant vertical lines may be used. A composite video signal of such a test pattern is processed by the television receiver to display on the screen of the television receiver picture tube a reproduction of the test pattern. When the vertical spacing between the lines of the reproduced test pattern is different on the right hand side of the picture from that on the left hand side, an asymmetrical nonlinearity to the display is present. When the spacing between vertical lines is the same on both sides but different in the center, symmetrical nonlinearity is present.

The asymmetrical type of nonlinearity finds its causes in imperfections in the deflection current waveform or in the construction and assembly of the picture tube-yoke combination. During horizontal scan, the horizontal deflection coils form an LC resonant circuit with the trace or S-capacitor when the trace switch is conducting. The horizontal deflection current during this time will have the shape of a portion of a sinewave. Since losses are present in the deflection circuit, the sinewave is a damped one.

With a perfectly constructed and assembled picture tube-yoke combination, wherein the undeflected electron beam lands on the center of the screen, the horizontal deflection current has the same amplitude but opposite polarities when the beam is deflected to the respective edges of the screen.

A portion of a damped sinewave horizontal deflection current $i_y$ with equal amplitudes, $I_p$, and opposite polarities at the beginning and end of scan is illustrated in FIG. 3. Such a waveform is nonsymmetrical in time with respect to the zero current axis. The time from the start of scan at the left edge L of the screen to the zero crossing of the scanning current $i_y$, the undeflected landing spot of the electron beam at the center of the screen, is shorter than the time from the zero crossing to the end of scan at the right edge R of the screen. The effect of such asymmetry to the scanning current waveform is that the reproduced picture of the test pattern displayed on the screen is expanded on the left side of the screen and compressed on the right side.

Another cause of asymmetrical nonlinearity is horizontal displacement of the raster due to the misalignment of the picture tube-yoke combination. In this case, the amplitudes of the horizontal deflection current are different at the two points where the electron beam is deflected to the two screen edges. A portion of a sinewave deflection current between such amplitudes is inherently asymmetrical.

Even after S-correction of the deflection current has been provided, the geometrical properties of the picture tube produce a remaining symmetrical nonlinearity. For a picture tube where the distance between the center of the deflection field and the screen is constant for all deflection angles, a linear relationship exists between deflection current and the position of the electron beam landing spot on the screen. With present picture tubes, where such a distance is not constant, a linear relationship does not exist. What does exist is a relatively complicated relationship between deflection current amplitude and spot position, requiring a specific deflection current waveshape to produce an ideal linear relationship.

A conventional horizontal deflection circuit produces a deflection current of sinusoidal waveshape of which the frequency is the sole variable. Changing the value of the S-shaping capacitor varies the amount of correction obtained for symmetrical nonlinearity distortion. For 110° tubes, the selection of the degree of S-correction is a compromise between acceptable amounts of nonlinearity at any point on the screen versus much smaller amounts of nonlinearity over the center portion extending towards the edges and relatively excessive amounts of nonlinearity at the very edges of the screen.

When the edge-to-edge scanning current has a substantially symmetrical waveform, the asymmetrical nonlinearity is minimal. However, when deflection circuit operation produces dissipation or losses, the scanning current waveform is a damped asymmetrical waveform, as illustrated by the solid-line waveform of FIG. 4.

To provide correction for such an asymmetrical linearity distortion, a conventional, biased saturable reactor may be connected in series with the horizontal deflection winding to cause the scanning current to rise more slowly during the first half of horizontal trace to thereby produce a relatively symmetrical waveform. The symmetrical waveform produced by use of a saturable reactor linearity coil is illustrated by the dashed-line waveform of FIG. 4, where the amplitude of the deflection current $i_y$ at both the left L' and right R edges of the screen equals $I_p$, where L' represents the left edge of the picture tube screen based on the time scale t' rather than the time scale t associated with the solid-line waveform. Slowing down the rise of the scanning current during the first half of trace produces a zero crossing of the dotted-line waveform in the center of the time interval between L' and R.

Because of the way a biased saturable reactor linearity coil typically is constructed, relatively large tolerances exist in the inductance exhibited by the saturable reactor as a function of current and misadjustment of the saturable reactor may occur. Furthermore, such a solution to the problem of asymmetrical linearity distortion is a relatively costly one to implement, and in order to obtain optimal horizontal linearity, an additional horizontal centering circuit may be required.

A feature of the invention is to provide correction of asymmetrical linearity distortion by selecting for use the appropriate portion of the total scanning current waveform which has the required peak-to-peak value and which is practically symmetrical in waveshape about a particular reference line. When the damped, asymmetrical waveform of FIG. 5 is extended to the left, that portion of the waveform between points L' and R' is symmetrical. By changing the reference level of the delection current waveform by an amount $\Delta I$ in FIG. 5, one obtains a deflection current that is symmetrical between the left and right edges L' and R' of the picture tube.

The shift in reference level may be accomplished by producing in the horizontal deflection winding a DC component of the appropriate amplitude and polarity to of itself produce substantially all of the change to the scanning current that is needed to provide the entire correction for asymmetrical linearity distortion. In an embodiment of the invention, the DC component, $\Delta I$, to the deflection current is produced by a switched current source coupled to the deflection winding.

Introducing a DC current to the deflection current produces a horizontal shift to the scanned raster. This shift could result in a corresponding horizontal shift to the picture being displayed on the screen. To prevent such a picture shift, the phase relation between the video signal and the deflection current is adjusted in order to obtain a properly centered picture.

Figure 1:
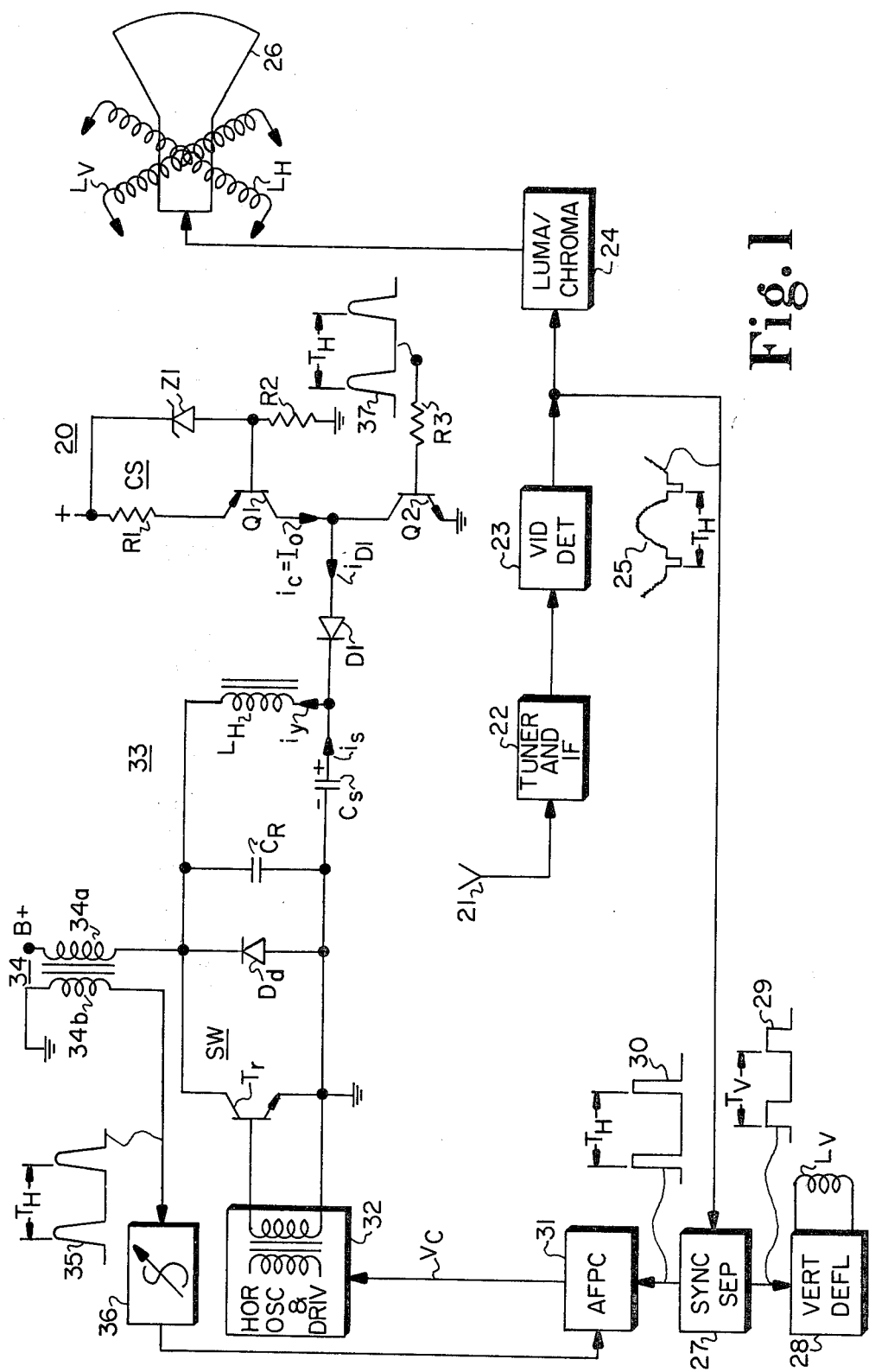
FIG. 1 illustrates a horizontal deflection circuit with a linearity correction circuit embodying the invention.

In a television receiver, illustrated in FIG. 1, transmitted radio frequency signals are received at an antenna 21 and applied to the tuner and intermediate frequency circuitry 22 to produce an IF signal. The IF signal is demodulated by a video detector 23 to develop a baseband composite video signal 25, containing picture information and horizontal and vertical scan synchronizing information. A deflection yoke containing horizontal and vertical deflection windings $L_H$ and $L_V$ is located over the neck of a cathode ray tube 26 so as to generate a scanned raster.

Composite video signal 25 is applied to a luminance and chrominance processor 24 to derive drive signals that are applied to the various electrodes of the cathode ray tube so as to produce a picture display from the picture information contained in the composite video signal.

Composite video signal 25 is also applied to a sync separator 27 to produce vertical synchronizing pulses 29 repeating at a frequency $1/T_V$ where $T_V$ is the vertical deflection interval. Vertical synchronizing pulses 29 are applied to a vertical deflection circuit 28 in order to synchronize the generation of vertical scanning current in the vertical deflection winding $L_V$ with the picture portion of the composite video signal 25.

To generate horizontal scanning current $i_y$ in horizontal deflection winding $L_H$, a horizontal deflection circuit 33 is energized through the primary winding 34a of a flyback transformer 34 by the voltage developed at a B+ terminal. Horizontal deflection circuit 33 includes a horizontal oscillator and driver circuit 32 that applies a horizontal rate switching signal to a horizontal output transistor Tr of a trace switch SW that also includes a damper diode $D_d$. Horizontal deflection winding $L_H$ is coupled in series with a trace or S-shaping capacitor $C_S$ across trace switch SW. When trace switch SW is conducting during the horizontal trace interval, the voltage developed across trace capacitor $C_S$ is applied to horizontal deflection winding $L_H$ to generate the trace portion of the horizontal scanning current $i_y$. When trace switch SW is nonconductive, horizontal deflection winding $L_H$ forms a resonant retrace circuit with a capacitor $C_R$ to generate the retrace portion of horizontal scanning current $i_y$.

To synchronize horizontal scanning with the picture portion of composite video signal 25, sync separator 27 generates horizontal sync pulses 30 that are applied to a conventional automatic frequency and phase control circuit 31. Also applied to AFPC circuit 31 are horizontal retrace pulses 35 generated by a flyback transformer winding 34b and applied to the AFPC circuit through a voltage integrator 36. AFPC circuit 31 compares the phase of the integrated retrace pulses to that of horizontal sync pulses 30 and develops a control voltage $V_c$ that is applied to a voltage controlled oscillator in horizontal oscillator and driver 32 so as to adjust the switching of horizontal output transistor Tr to provide synchronized scanning.

Losses incurred during a deflection cycle, such as losses produced by dissipation in the distributed resistance of the horizontal deflection winding $L_H$, tend to change the scanning current to one that would introduce asymmetrical linearity distortion to the picture display. To obtain a picture display that is substantially without such linearity distortion, a linearity correction circuit 20, embodying the invention, is coupled to horizontal deflection winding $L_H$.

During horizontal trace, a current source CS, comprising transistor Q1, resistors R1 and R2, and a zener diode Z1, delivers a correction current $i_c$, of constant magnitude $I_0$, via a diode D1, to the junction terminal of horizontal deflection winding $L_H$ and trace capacitor $C_S$. A transistor Q2, keyed by retrace pulses 37 applied to the transistor base through a resistor R3, shunts the correction current $i_c$ to ground during retrace.

One notes from FIG. 1 that the current $i_s$ flowing in trace capacitor $C_S$ is $i_s = i_y - i_{D1}$. Since direct current cannot flow through a capacitor, the average value of the current $i_s$ is zero. Thus, the average value of the deflection current $i_y$ is equal to the average value of the current flowing from diode D1 or is equal to $I_0$.

By means of linearity correction circuit 20, the scanning current $i_y$ includes a DC component of magnitude $I_0$ that flows in a positive direction, a direction that provides compensation for the introduction of asymmetrical linearity distortion incurred by losses during a deflection cycle. The magnitude $I_0$ of the correction current $i_c$ is sufficient to by itself produce substantially all of the change to the scanning current $i_y$ that is needed to obtain a picture display that is substantially without asymmetrical linearity distortion. No additional asymmetrical linearity distortion correction circuitry, such as a biased saturable reactor, need be used. The DC component produces substantial symmetry of the scanning current waveform about the zero DC reference level during the interval within a horizontal deflection cycle that a horizontal raster line is visible.

Correction circuit 20 by providing a DC correction current with no significant AC component will not significantly introduce symmetrical distortion to the deflection current waveform.

As an example of a deflection circuit with linearity correction, embodying the invention, selected values for components, voltages and currents for the circuits illustrated in FIG. 1 are as follows: Tube: A51-421X, deflection angle 90°; $L_H = 1.93$ millihenry; 2.20 ohms; $C_R = 6.0$ nanofarad; $C_S = 0.47$ microfarad; B+ = 127 volts; $i_y = 2.9$ amperes, peak-to-peak (assume correction circuit 20 present); $i_c = I_0 = 85$ milliampere, DC.

Figure 2:
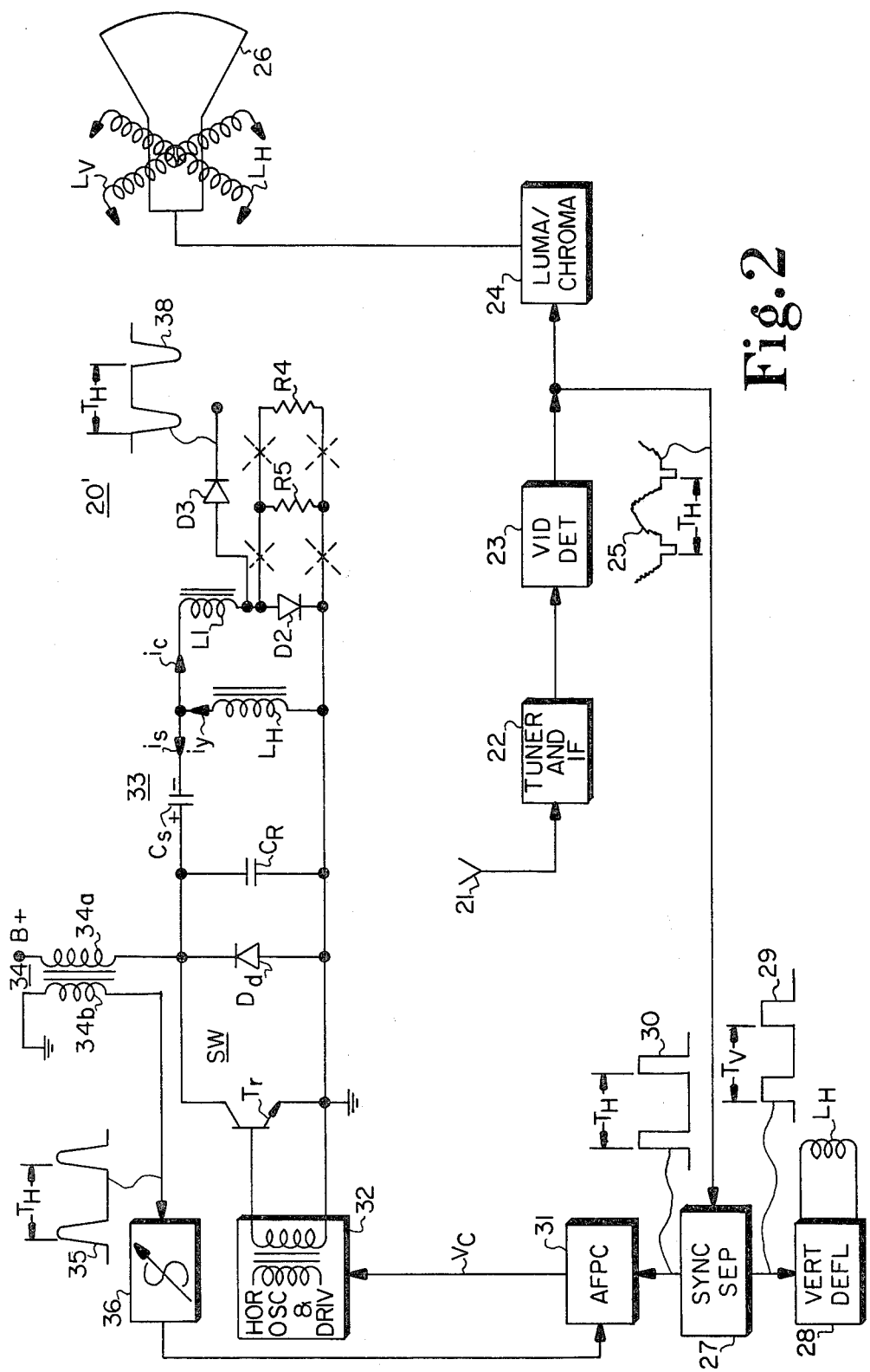
FIG. 2 illustrates a horizontal deflection circuit with a different linearity circuit embodying the invention.
Figure 3:
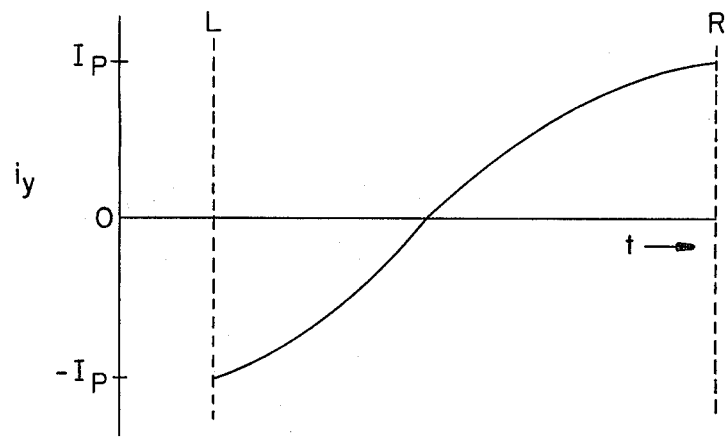
FIG. 3 illustrates a deflection current waveform uncorrected for asymmetrical linearity distortion.
Figure 4:
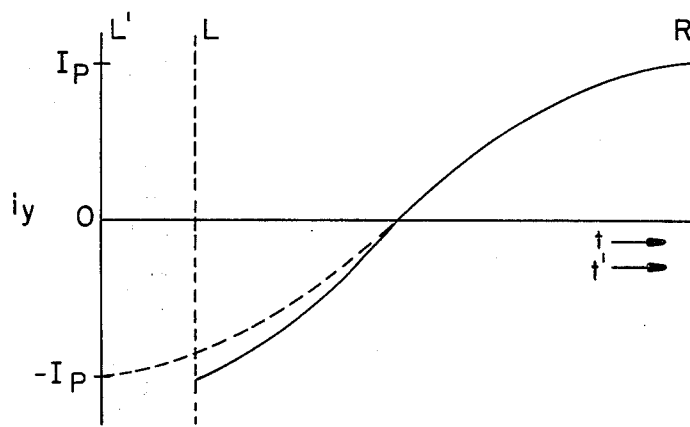
FIGS. 4 and 5 illustrate various deflection current waveforms useful in the explanation of different types of current for asymmetrical linearity distortion.
Figure 5:
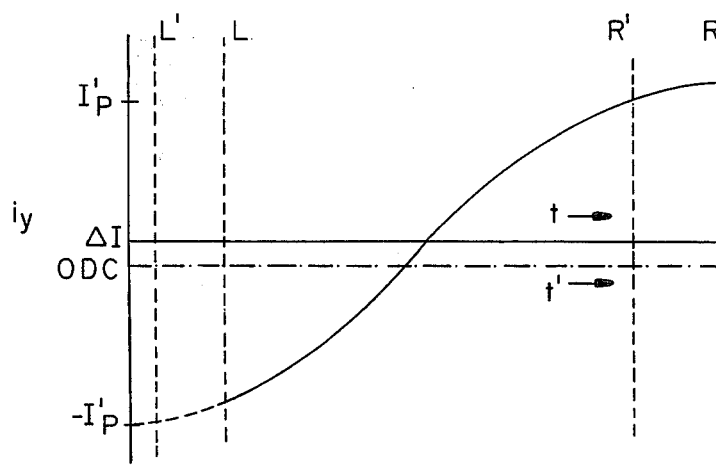

Another embodiment of a linearity correction circuit according to the invention is illustrated in FIG. 2. Items in FIGS. 1 and 2, identified by the same symbols, operate in a similar way or represent similar quantities. In the linearity correction circuit 20' of FIG. 2, an inductor L1 of value substantially greater than the inductance of horizontal deflection winding $L_H$ is coupled in series with a diode D2 across horizontal deflection winding $L_H$ such that both the cathode of diode D2 and the bottom terminal of winding $L_H$ are connected to the emitter electrode of horizontal output transistor Tr.

During horizontal retrace, the retrace pulse developed by horizontal deflection winding $L_H$ causes a current to flow, via correction coil L1 and a diode D3, to a source or point of negative retrace pulse voltage 38, obtained from a winding, not illustrated in FIG. 2, of the flyback transformer 34, thereby storing in L1 a given amount of energy at the end of retrace.

During the subsequent horizontal trace interval, current will continue to flow from inductor L1 through diode D2 to horizontal deflection winding $L_H$. Thus, a unidirectional current component is coupled into horizontal deflection winding $L_H$ in addition to the regular deflection current generated by deflection circuit 33. An advantage of correction circuit 20' is the flexibility of control that it provides. Control of the magnitude of the unidirectional current is possible through control of the inductance of coil L1, through control of the amplitude of the negative retrace pulse voltage 38, by locating a resistor in parallel with diode D2, or by locating a resistor in series with diode D3.

In addition to using correction circuits 20 and 20' to provide correction for asymmetrical linearity distortion resulting from dissipative losses in the deflection circuit, the correction circuits may also be used to provide raster centering. For three different types of picture tubes, the amount of DC offset to the deflection current $i_y$ required for correction of asymmetrical linearity distortion has been evaluated and is given below in terms of the amount of beam landing spot displacement produced by the DC offset current:

tube A67-701 X—approximately 6 mm to the right;
tube A66-540 X—approximately 6 mm to the right;
tube A51-421 X—approximately 8.5 mm to the right.

The above listed-tubes, however, are specified to have a possible horizontal raster displacement of $\pm 5$ millimeters about the center of the screen. For such tubes, a fixed value inductor L1 may be used together with two resistors R4 and R5 placed in parallel with diode D2.

For tubes with a relatively large raster centering error but not exceeding 5 millimeters towards the left when the raster is viewed from the front of the faceplate, both resistors R4 and R5 are clipped or removed from the circuit, as indicated by the dashed X marks of FIG. 2. For tubes with a relatively large raster centering error but not exceeding 5 millimeters towards the right, both resistors are left in the circuit. For tubes without substantial centering errors, only one of the resistors is left in the circuit. With such an arrangement of resistors R4 and R5, a tolerance on nonlinearity of $\pm 1\%$ or less may be achieved.

When horizontal asymmetrical linearity distortion is corrected by means of the correction circuits 20 and 20' of FIGS. 1 and 2, a phase adjustment of the horizontal scanning current relative to the picture content of the composite video signal may be required. A phase shift or offset between the occurrence of horizontal sync and horizontal retrace, on the order of 1 microsecond, may be needed. Such a phase shift may be accomplished by having voltage integration circuit 36 be adjustable to change the amount of voltage integration of retrace pulses 35. If an IC combining the functions of AFPC circuit 31 and the horizontal oscillator portion of circuit 3 is used, such as the IC TDA2590, a phase shift on the order of 1 microsecond may be accomplished by applying a DC voltage offset to the phase shifter input at pin 5 of this IC.

When the horizontal deflection current is modulated for east-west pincushion correction, the correction current $i_c$ must be modulated as well. Otherwise, a vertical line in the center of the picture may be reproduced in the raster slightly bent in shape. For the correction circuit 20 of FIG. 1, east-west modulation of the correction current $i_c$ can be accomplished by introducing a vertical rate modulating signal to the base of transistor Q1. For the correction circuit 20' of FIG. 2, vertical rate modulation of the correction current $i_c$ is automatically accomplished since the amplitude of $i_c$ is linearly related to the amplitude of $i_y$.

What is claimed is:

1. In a television display system having a cathode ray tube and a deflection yoke associated therewith to generate by means of raster scanning a picture display from the information contained in a composite video signal, a deflection circuit with linearity correction, comprising:
a deflection winding;
a trace switch that is periodically switched by a deflection rate signal synchronized with said composite video signal to generate raster scanning current in said deflection winding during a deflection cycle, wherein losses incurred during a deflection cycle tend to change said scanning current to one that would introduce asymmetrical linearity distortion to said picture display;
a source of retrace pulse voltage;
a source of correction current including an inductance; and
switching means including a first rectifier that periodically couples said inductance to said deflection winding during the trace interval of said deflection cycle to conduct current from said inductance to said deflection winding and a second rectifier coupled to said inductance and to said source of retrace pulse voltage to conduct current from said inductance to said retrace pulse voltage source during the retrace interval of said deflection cycle to develop in said scanning current a DC component that flows in a direction that corrects for the introduction of said asymmetrical linearity distortion.

2. A deflection circuit with linearity correction according to claim 1 wherein said DC component produces substantially all of the change to the scanning current that is needed to obtain a picture display that is satisfactorily without said asymmetrical linearity distortion.

3. A deflection circuit with linearity correction according to claim 1 including a deflection oscillator that provides said deflection rate signal and means responsive to a first signal representative of the phase of said composite video signal and to a second signal representative of the phase of said scanning current for adjusting the phase of said deflection rate signal relative to that of said composite video signal to provide an offset between the occurrence of the synchronizing signal portion of said composite video signal and the occurrence of the retrace portion of said scanning current so as to substantially center the picture display on the screen of said cathode ray tube.

4. In a television display system having a picture tube and a deflection yoke associated therewith to generate, by means of scanning horizontal raster lines, a picture display from the information contained in a composite video signal, a horizontal deflection circuit with linearity correction, comprising:

a horizontal deflection winding;

a trace switch that is periodically switched by a horizontal deflection rate signal synchronized with said composite video signal to generate horizontal scanning current in said deflection winding during a deflection cycle, wherein losses incurred during a deflection cycle tend to change said scanning current to one that would introduce asymmetrical horizontal linearity distortion to said picture display;

a source of correction current; and switching means that periodically couples said correction current source to said deflection winding during a first portion of said deflection cycle and couples said correction current source to a reference point during a second portion of said deflection cycle to develop in said scanning current a DC component that produces substantial symmetry of the scanning current waveform about a reference level during the interval within said deflection cycle that a horizontal raster line is visible to correct for the introduction of said asymmetrical linearity distortion, wherein said correction current source comprises a constant current source that provides a substantially constant current having a magnitude substantially that of said DC component.

5. A deflection circuit with linearity correction according to claim 4 wherein said correction current source is coupled to a junction terminal of said deflection winding and a trace capacitance and said switching means is coupled to said junction terminal for shunting current from said source away from said deflection winding during the retrace interval of a deflection cycle.

6. A deflection circuit with linearity correction according to claim 4 wherein said DC component produces substantially all of the change to the scanning current that is needed to obtain a picture display that is satisfactorily without said asymmetrical linearity distortion.

7. A deflection circuit with linearity correction according to claim 4 including a deflection oscillator that provides said deflection rate signal and means responsive to a first signal representative of the phase of said composite video signal and to a second signal representative of the phase of said scanning current for adjusting the phase of said deflection rate signal relative to that of said composite video signal to provide an offset between the occurrence of the synchronizing signal portion of said composite video signal and the occurrence of the retrace portion of said scanning current so as to adjust the centering of the picture display on the screen of said cathode ray tube.

* * * * *